United States Patent
Bouvier

(10) Patent No.: US 8,150,008 B2
(45) Date of Patent: Apr. 3, 2012

(54) TELECOMMUNICATIONS DATA PROCESSING SYSTEM AND TERMINAL AND A METHOD OF OPERATING IT

(75) Inventor: Herve Bouvier, Les Pennes Mirabeau (FR)

(73) Assignee: France Telecom, Paris (FR)

( * ) Notice: Subject to any disclaimer, the term of this patent is extended or adjusted under 35 U.S.C. 154(b) by 1263 days.

(21) Appl. No.: 11/631,269

(22) PCT Filed: Jun. 27, 2005

(86) PCT No.: PCT/EP2005/052999
§ 371 (c)(1),
(2), (4) Date: May 18, 2007

(87) PCT Pub. No.: WO2006/003129
PCT Pub. Date: Jan. 12, 2006

(65) Prior Publication Data
US 2008/0292072 A1    Nov. 27, 2008

(30) Foreign Application Priority Data

Jun. 29, 2004   (FR) ...................................... 04 07178

(51) Int. Cl.
*H04M 15/00*    (2006.01)
(52) U.S. Cl. ............... 379/114.27; 379/114.28; 379/133

(58) Field of Classification Search ............... 379/90.01, 379/133–139, 114.27–114.29; 709/217–219, 709/223–229; 370/493–496
See application file for complete search history.

(56) References Cited

U.S. PATENT DOCUMENTS

| 6,574,610 | B1 | 6/2003 | Clayton et al. | |
| 2002/0075382 | A1* | 6/2002 | Cohen | 348/14.01 |
| 2004/0103191 | A1 | 5/2004 | Larsson | |

FOREIGN PATENT DOCUMENTS

| DE | 198 08 183 A1 | 9/1999 |
| DE | 103 35 367 A1 | 3/2005 |
| WO | WO 03/051028 A | 6/2003 |
| WO | WO 03/096189 A | 11/2003 |
| WO | WO 03/100688 A | 12/2003 |

* cited by examiner

*Primary Examiner* — Melur Ramakrishnaiah
(74) *Attorney, Agent, or Firm* — Cozen O'Connor

(57) ABSTRACT

A telecommunications data processing system comprising a terminal (T) adapted to send a telecommunications service request to a telecommunications infrastructure (IT1) associated with a data-storage infrastructure (IT2) for storing data (DE) about the utilization of the telecommunications service. The telecommunications terminal (T) includes means for producing service utilization data (DE), which data relates to the telecommunications terminal (T) and is based on data (DT) contained in an end-of-service and triggering message sent by the data-storage infrastructure (IT2).

20 Claims, 2 Drawing Sheets

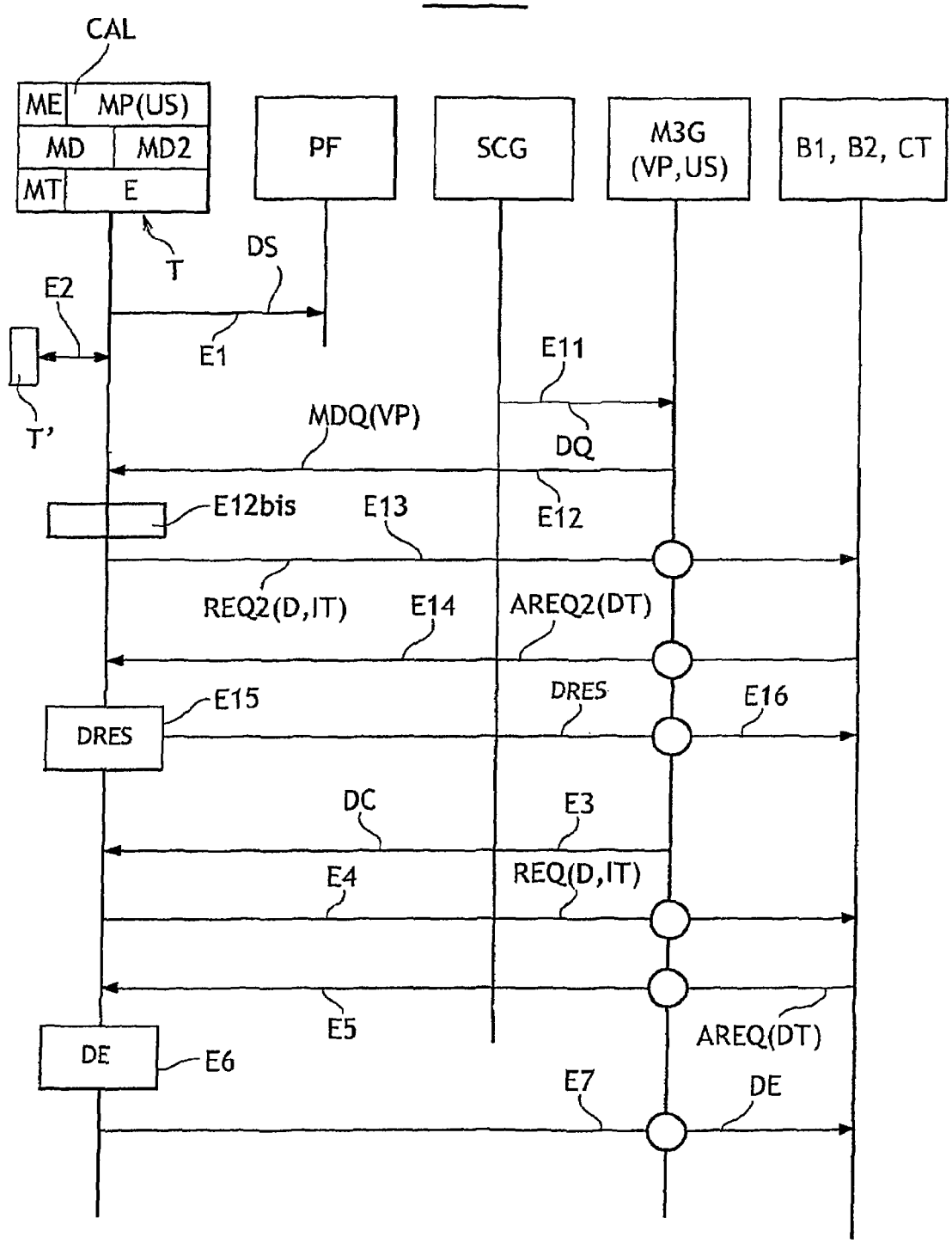

TELECOMMUNICATIONS DATA PROCESSING SYSTEM AND TERMINAL AND A METHOD OF OPERATING IT

RELATED APPLICATIONS

This is a U.S. National Phase Application under 35 USC 371 of International Application PCT/EP2005/052999, filed on Jun. 27, 2005.

FIELD OF THE INVENTION

The invention relates to a system for processing telecommunications data.

One field of application of the invention relates to telecommunications terminals for voice and/or pictures and/or data.

BACKGROUND OF THE INVENTION

Existing devices for processing telecommunications data include a first infrastructure in the form of a telecommunications infrastructure for transporting payload signals for terminal users, i.e. signals transporting information to be presented on those user terminals (voice, pictures, data), and a second infrastructure for storing data about the utilization of the telecommunications service provided by the first infrastructure, e.g. for billing purposes.

This utilization data for each connection involving a terminal is stored in a memory of the second infrastructure.

Consequently, because of the correspondingly large number of connections involving the terminals, the second infrastructure has to manage a large quantity of utilization data.

There are two approaches to generating this utilization data.

A first approach consists in generating and storing utilization data in batches, as contrasted with a second approach that consists in generating and storing utilization data in real time.

The first approach has the drawback of imposing an undesirable time-delay in the processing of utilization data, and also necessitates the use of very costly machines having a very large memory space.

The technique used at present by systems that adopt the real-time approach has the drawback that it is not stabilized, in the sense that it has difficulties processing in real time very large quantities of utilization data, for example the utilization data for several thousand connections per second.

The introduction of content services using the Universal Mobile Telecommunication System (UMTS) and asynchronous digital subscriber lines (ADSL) will increase exponentially the number of connections and the volumes of utilization data associated with these services. This increase in traffic will generate ever-higher costs in terms of memory size and offers no guarantee that real-time performance will be achieved with these volumes of utilization data, since real time performance implies a particular and limited processing time, for example around one second between the end of a connection involving a terminal and storage of the corresponding utilization data in the second infrastructure. At present, with several tens of millions of potential terminals and an average of seven or eight connection requests or connections per terminal per day, there is no system offering real-time performance that is capable of absorbing all the traffic.

SUMMARY OF THE INVENTION

One object of the invention is to provide a telecommunications data processing system that alleviates the drawbacks of the prior art, that provides real-time operation, and that reduces infrastructure costs.

This and other objects are attained in accordance with one aspect of the invention directed to a telecommunications data processing system comprising a telecommunications terminal that includes a data channel for sending and receiving data and that is adapted to send a telecommunications service request to a first infrastructure in the form of a telecommunications infrastructure, the first infrastructure being associated with a second infrastructure for storing data about the utilization of said telecommunications service, the data storage, second infrastructure includes sender means for sending an end of telecommunications service and triggering message to the telecommunications terminal;

which terminal includes production means for producing data about the utilization of said telecommunications service, which data relates to the telecommunications terminal and is based at least on data contained in said end of telecommunications service and triggering message; and the telecommunications terminal includes detector means for detecting said end of telecommunications service and triggering message in order to cause said production means to produce said utilization data and to transmit it over the data channel to said second infrastructure for storing data about the utilization of said telecommunications service.

Thus the means for producing utilization data are embedded in the user terminal and transparent to the user.

The invention therefore eliminates the high costs inherent to a centralized real-time system whilst guaranteeing real-time transmission of utilization data after termination of the telecommunications service involving the terminal.

According to other features of an embodiment of the invention:

the means for sending an end of telecommunications service and triggering message comprise:
first means for sending a first message which is an end of telecommunications service message containing data relating to the telecommunications service executed by the first telecommunications infrastructure in response to the service request; and
second means for sending a second message which is a triggering message containing data about the utilization of the terminal;

the production means being adapted to produce utilization data consisting of at least the utilization data of the terminal contained in the second message, and to trigger updating on the basis of data contained in the end-of-service, first message;

the terminal includes means for generating and sending automatically to the second infrastructure, in response to detection of the first message by said detection means, a message requesting utilization data for the terminal, the second sending means of the second infrastructure being adapted to send the triggering second message back to the terminal automatically in response to said request message;

the second infrastructure includes a database in which said utilization data is stored;

the second infrastructure includes a server for interrogating and updating the database;

the second infrastructure includes a storage account for utilization data that can be associated with one or more terminals, each terminal being associated with a single account;

the means adapted to produce the utilization data are also adapted, during provision of the telecommunications service between the terminal and the first infrastructure, to produce reservation data relating to the telecommunications terminal and based on data from a telecommunications service unit having particular characteristics;

said sender means for sending the second infrastructure are also adapted to send to the terminal a reservation request message containing said data from a telecommunications service unit having particular characteristics, the terminal including means for detecting the reservation request message; and the production means are adapted to be triggered by the means for detecting the reservation request message to produce utilization data consisting of at least said updated reservation data on the database contained in said end of telecommunications service and triggering message and to cause it to be transmitted to the second infrastructure for storing utilization data;

the terminal includes means responding to detection of said reservation request message by said detection means, to generate and send automatically to the second infrastructure a second request message requesting data about the utilization of the terminal, the sender means of the second infrastructure being adapted to send back automatically to the terminal in response to said second request message a third message which is a triggering message containing data about the utilization of the terminal; and the production means are adapted to produce reservation data consisting of at least the data about the utilization of the terminal contained in the third message and updated on the basis of said data contained in said reservation request message and coming from a telecommunications service unit having particular characteristics;

the terminal includes means for downloading from a database of the second infrastructure parameters of the means for producing the utilization data.

Another object of the invention is directed to a telecommunications terminal that is adapted to send a telecommunications service request to a telecommunications first infrastructure and that includes a data channel for sending and receiving data, wherein:

the telecommunications terminal includes detector means enabling the channel to detect an end of telecommunications service and triggering message and production means for producing data about the utilization of said telecommunications service, which data relates to the telecommunications terminal and is based at least on data contained in said end of telecommunications service and triggering message present in the detection means; and said detection means are adapted, in the presence of said end of telecommunications service and triggering message, to instigate production of said utilization data by said production means and its transmission over the data channel to a second infrastructure for storing data about the utilization of said telecommunications service.

An embodiment of the invention provides an infrastructure for storing data about the utilization of a telecommunications service, said service being carried out by a telecommunications infrastructure in response to a telecommunications service request sent from a telecommunications terminal, wherein said infrastructure includes sender means for sending an end of telecommunications service and triggering message to the telecommunications terminal.

characterized in that said infrastructure includes sender means for sending an end of telecommunications service and triggering message to the telecommunications terminal.

Another aspect of the invention is directed to a method of operating the telecommunications terminal wherein the method comprises the steps of:

the telecommunications terminal sending a telecommunications service request to a telecommunications first infrastructure;

the data channel of the telecommunications terminal for sending and receiving data detecting an end of telecommunications service and triggering message;

in the presence of said end of telecommunications service and triggering message, automatically producing data about the utilization of said telecommunications service, which data relates to the telecommunications terminal and is based at least on data contained in said end of telecommunications service and triggering message; and automatically sending said utilization data over the data channel to a second infrastructure for storing data about the utilization of said telecommunications service.

This method can be implemented in the telecommunications terminal by a computer program having instructions for executing the steps of the method. The computer program may be provided to the telecommunication terminal by downloading it from a server containing said computer program.

BRIEF DESCRIPTION OF THE DRAWINGS

The invention will be better understood on reading the following description, which is given by way of non-limiting example only and with reference to the appended drawings, in which:

FIG. 3 is a diagram of process steps executed by a second embodiment of the processing system.

DETAILED DESCRIPTION OF THE DRAWINGS

Figure 1:
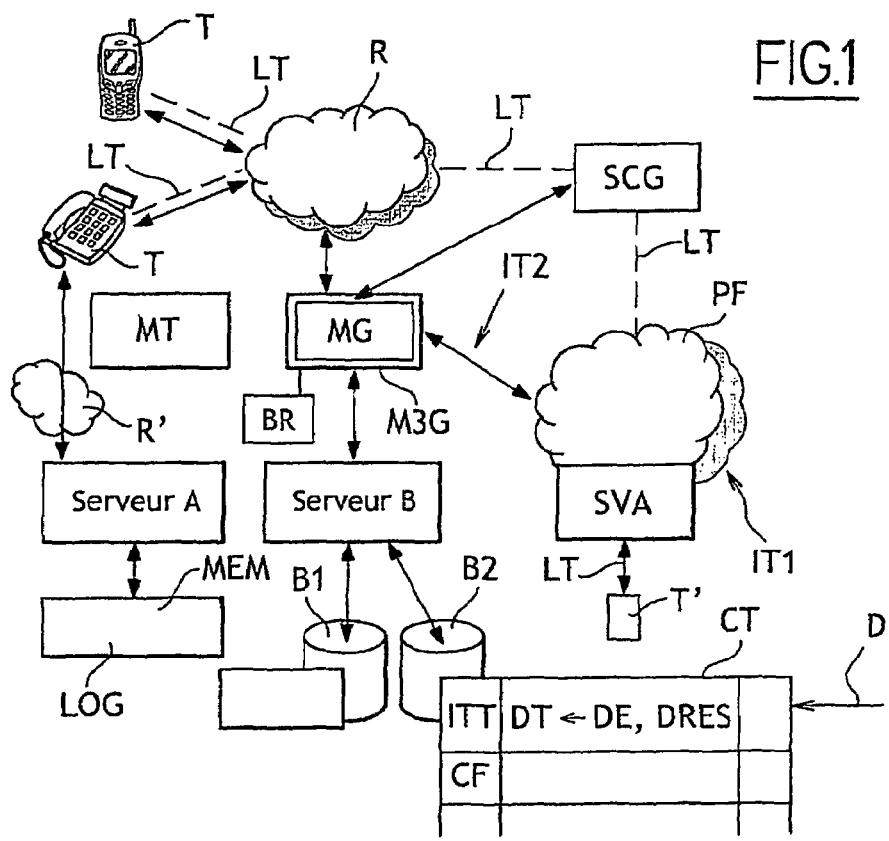
FIG. 1 is a diagram of a processing system of the invention.

The telecommunications terminal T in FIG. 1 is a fixed or mobile GPRS/UMTS terminal, for example, and includes an ADSL modem, for example. The terminal takes the form of a telephone, for example, as shown here, but it could equally be a computer with an ADSL modem or a personal digital assistant (PDA) with an ADSL modem. The terminal T is JAVA-compatible, for example.

The terminal T is adapted to set up a telecommunications connection LT with a server type services platform PF, for example a video on demand, teleshopping, video game, or other video server, depending on the telecommunications service requested by the terminal T and implemented by this first infrastructure IT1. Of course, the terminal T could equally well set up a telecommunications connection LT with another terminal T' using the first infrastructure IT1 via a services platform PF offering voice over IP, via a PSTN (public switched telephone network), or via an ISDN (integrated services digital network), and including means for connecting the terminal T to the other communications terminal T' or to an Internet or other site, depending on the telecommunications service requested by the terminal T and implemented by the first infrastructure IT1. In the first infrastructure, the network R providing contact with the terminal T comprises a fixed telecommunications network and a mobile telecommunications network, for example. The upper terminal T represented in FIG. 1 being a mobile terminal and the lower terminal T being a fixed terminal, it is assumed below that a telecommunications connection LT to be set up from the terminal T to another telephone T' is a voice and video connection via the network R, the gateway SCG, and the platform PF.

Figure 2:
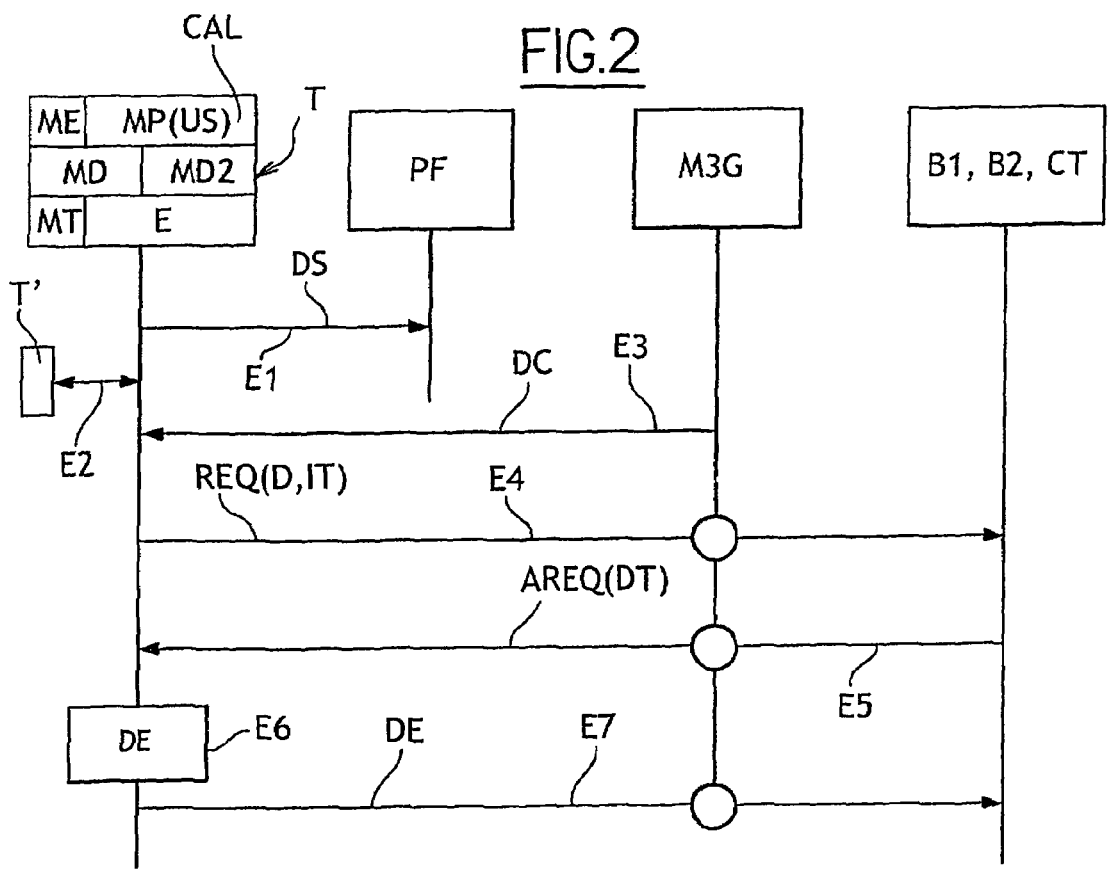
FIG. 2 is a diagram of process steps executed by a first embodiment of the processing system.

Generally speaking, and as shown in FIG. 2, to set up the telecommunications connection LT, the terminal T includes a channel E for sending and receiving data that is used in a step E1 to send a telecommunications service request DS to the platform PF of the first infrastructure IT1. The telecommunications service request DS identifies the type of telecommunications service requested by the terminal T, namely transport of voice and/or pictures and/or data over the telecommunications connection LT, which will therefore be of the corresponding type. After the step E1, the connection LT with a channel of the platform PF or of the terminal T' (this channel can be different from the channel E or identical to the channel E if the connection LT is a data connection) is set up by the infrastructure IT1 in a step E2 and it continues until it is terminated by the terminal T, by the terminal T', by the platform PF, or by the infrastructure IT1.

In the preceding example, the service request DS is a message transporting the URL address (IP address) of the platform PF or the number of the telephone T' as entered by the user on the terminal T, for example. The service request DS can be directed to the platform PF or to the telephone T', for example.

Starting the means ME in the terminal T for sending the service request DS activates a central calculation unit CAL in the terminal T including means MP for processing data and producing utilization data DE, as described below.

The first infrastructure IT1 is associated with a second infrastructure IT2 for storing data, in particular data DE about the utilization of the telecommunications service used by the first infrastructure IT1 and the terminal T. For example, the utilization data DE is used to quantify the utilization of the first infrastructure IT1 by the terminal and includes data for determining information for billing the telecommunications service used in this way, for example the IP address of the required service, the quantity of data exchanged over the connection LT, the quality of service subscribed to in advance by the terminal T, the time and duration of the connections involving the terminal, the type of network used (for example fixed or mobile), the identifier of the terminal that requested the connection, and/or the identifier of the called entity or terminal, and so on.

The second infrastructure IT2 includes a "3G mediation" module M3G for real-time routing of messages, for example request and response messages, between the terminal T and a server D. This routing module M3G includes means MG for generating and sending end-of-telecommunications service messages DC to the terminal T that sent the service request DS when the connection LT via the first infrastructure IT1 involving the terminal T has terminated. The sender means MG are implemented in a transaction manager, for example.

The module M3G is warned of the end of the connection by the platform PF via the gateway SCG to which it is connected. The end-of-service message DC includes connection details including the information necessary for subsequent use of the service, such as, for example, the duration of the connection LT, the number of kbytes downloaded by the terminal T during the connection LT, etc. Where applicable, the message DC is the result of processing a plurality of messages relating to the progress of the connection LT and received by the module M3G from the first infrastructure IT1, for example a message from the network R, a message from the gateway SCG, and a message from the platform PF, which correspond to the various network layers (transport, etc.) of the first infrastructure IT1.

In a step E3, the module M3G sends the end-of-service message DC to the terminal T that sent the request DS corresponding to the service, via the gateway SCG and the network R. For example, the module M3G consults a database BR to discover the dynamic Internet Protocol (IP) address of the terminal T and sends the message DC to that IP address. Thereafter, steps E3 to E7 are executed automatically and in real time.

When the terminal T has received the end-of-service message DC, its calculation unit CAL generates a request message REQ to discover which data DT linked to the terminal T currently applies to the connection LT. For example, the data DT linked to terminal T includes the value of an account CT associated with the terminal T and constitutes data about the utilization of the terminal T. The data DT linked to the terminal T is stored beforehand in an account CT of a database B2 also known as a reference database B2. The data stored in the account CT associated with the terminal T also includes data about the prices agreed to by the user of the terminal T, for example. In a step E4, the channel E of the terminal T sends the request message REQ to the database B2 via the network R, the module M3G, and the server B, which together with the database B2 form part of the second infrastructure IT2.

The request message REQ sent by the terminal T also includes a flag D concerning blocking of the account CT associated with the terminal T and an identifier ITT of the terminal T, which is also present on the account CT.

When the database B2 has received the request REQ, in a step E5, it causes the server B to send the terminal T a response message AREQ including the data DT of the account CT associated with the identifier ITT of the terminal T via the module M3G, the gateway SCG, and the network R. In this step E5, the flag D is also set on the account CT of the database B2, which blocks the generation and processing of utilization data DE in respect of telecommunications services relating to the same account CT, for example if there is more than one terminal T linked to the same data DT and thus to the same account CT on the database B2. However, this blocking of the account CT is not a problem if there is more than one terminal T dependent on the account CT, in that there is a low probability of a plurality of these terminals simultaneously terminating their connection and requesting to use the account CT to generate the utilization data DE. The data DT linked to the terminal T allows utilization data DE to be generated for only one terminal T at a time, even if there is more than one terminal T linked to the data DT.

The calculation unit CAL of the terminal T also includes means MP for processing the message DC and the response message AREQ to calculate from the message DC and the data DT contained in the response message AREQ the data DE about the utilization of the telecommunications service relating to the terminal T.

As soon as the response-message AREQ is received over the channel E by the terminal T, in a step E5, reception and detection means MD of the calculation unit CAL detect the message in order, in a step E6, to trigger calculation of the utilization data DE on the basis of the message DC and the data DT. The response message AREQ therefore triggers the production means MP. To this end, the production means MP include, stored in the memory of the calculation unit CAL, rules for analyzing data and information contained in the messages DC and AREQ and for calculating the data DE.

The utilization data DE produced by the production means MP include, for example, a new value for the account CT obtained by decrementing the preceding value of the account in the data DT by an amount corresponding to the utilization of the telecommunications service, in accordance with the data contained in the message DC.

The data DT and DE about the account CT may be broken down into subvalues or "buckets", for example: fixed network connection time; mobile network connection time; number of SMS messages that can be sent; for example the account CT can store as data DT, DE: 15 minutes of mobile network connection time; 45 minutes of fixed network connection time; and 200 SMS messages, the value of the account CT corresponding to these subvalues being 1500 units, for example.

As soon as the means MP have produced the utilization data DE, they automatically trigger its transmission over the channel E to the database B2 via the network R, the module M3G and the server B in a step E7. This utilization data DE received from the terminal T by the database B2 is placed in the database B2 and stored therein and the new value of the account CT contained in the utilization data DE produced by the means MP is substituted for the preceding value of the account CT contained in the data DT, thus updating the utilization data DT.

The utilization data DE produced by the means MP can also include the modified message DC also containing the data DT contained in the message AREQ, which is stored in a database B1 in a step E7, this modified message DC serving to back up data that has led to the production of the data DE, for example to serve as legal proof in the event of a dispute. The modified message DC stored in the database B1 can also be used for automatically issuing or automatically printing a bill to be sent to the user of the terminal T.

The utilization data DE stored in the database B2 is used by the telecommunications operator providing the telecommunications service, who can also distribute it to other databases of other providers involved in providing the telecommunications service, and is subsequently used by the telecommunications operator to calculate the amount of payments to its providers, for example. These payments may also be included in the data DE calculated by the terminal T in the step E6 and stored in the database B2 for subsequent processing on another account CF associated with a provider and able to receive a plurality of payments from a plurality of terminals T.

Means are provided in the database B2 for releasing or canceling the flag D associated with the identifier ITT of the account CT as soon as the utilization data DE has been stored therein in the step E7. As soon as the flag D is released or cancelled, new utilization data DE can be generated by the terminal T or any other terminal linked to the same account CT and stored in the database B2 as described above for another telecommunications service request DS.

The steps shown in FIG. 3 and described below are effected between the step E1 and the step E3 and during the step E2.

After the step E1, the gateway SCG, which received the request DS from the terminal T in the step E1, sends a message DQ commanding reservation of the account to the module M3G in a step E11.

Having received the reservation command message DQ, the module M3G in turn sends a message MDQ requesting reservation of the account to the terminal T via the network R in the next step E12. This reservation request message MDQ contains data VP corresponding to a telecommunications service unit US fixed in advance in the second infrastructure IT2 or calculated in the terminal T during a step E12b is after the step E12 and before the step E13, i.e. corresponding to a connection LT having prescribed characteristics, for example the prescribed downloading of 2 Megabytes for a data connection LT, a prescribed call time of 10 minutes for a voice connection LT on the mobile network for a mobile terminal T, or a prescribed local call time of 1 hour for a fixed terminal T. The connection LT taking place during the step E2 could represent a fraction or a multiple of this prescribed service unit US.

Having received the reservation request message MDQ in the step E12, the terminal T detects it (by means of the detection means MD2) and then executes a step E13 that is analogous to the step E4 in that a second request message REQ2 requesting data DT linked to the terminal T, analogous to the message REQ and including the flag D, is sent from the terminal T to the database B2, which stores the flag D and sends back in a step 14 analogous to the step E5 a response message AREQ2 that is analogous to the second message AREQ and is called the third message, this third message including the data DT stored in the database B2.

Having received the message AREQ2 in the step E14, the calculation unit CAL of the terminal T determines automatically (by means of the means MP), in the step E1, reservation data DRES that is then sent to the database B2 over the channel E in a step 16. On each occasion, this reservation data DRES produced by the means MP is equal to the value of the account CT contained in the message AREQ2 and decremented by the prescribed decrement value or quota VP, which corresponds to the service unit US. Where applicable, the subvalue present on the account CT and corresponding to the service unit US is decremented by the value VP and other subvalues present on the account CT and not corresponding to the service unit US are retained and are not decremented. The reception of the reservation data DRES by the database B2 in a step E16 automatically leads to the release or cancellation of the flag D on the account CT and to the storage of this reservation data DRES on the account C2 in the database B2. This reservation data DRES is identified as such in the database B2 and is stored therein as utilization data DT linked to the terminal for use in the subsequent steps.

The steps E12, E13, E14, E15 and E16 can be executed one or more times during the step E2 of the first infrastructure IT1 providing the telecommunications service.

The steps E3, E4, E5, E6 and E7 are then executed in the same manner as before. The production means MP of the terminal T include rules for analyzing the reservation data DRES to calculate the utilization data DE allowing for the characteristics of the data DRES and the message DC during the step E6. Accordingly, the decrement value applied to the data DRES in the step E6 to calculate the data DE, which takes account of the message DC, is reduced by the sum of the decrement values applied during the step E15 to calculate this data DRES.

The reservation data DRES is used each time to predict the utilization data DE during the provision of the service. Of course, the utilization data DE for the terminal T finally stored in the database B2 in the step E7 is produced by that terminal T in the step E6 taking account of the latest value of the data DT linked to the terminal, obtained in the step E4, which value will be equal to the latest value of the data DRES stored therein during the last step E16.

If the telecommunications service is interrupted or fails during the step E2, although a step E16 has been executed, the means MP generate corresponding utilization data DE and send it to the database B2 to be stored there, the utilization data DE then corresponding to the service actually provided to the terminal T, the data in respect of which will have been placed in the message DC.

The data processing means MP and the utilization data production means DE in the terminal T comprise, for example, a hardware portion cooperating with a software portion or program LOG that is permanently stored in the terminal T, for example, or downloaded from an external network R' and a server A interrogating a memory MEM in which the software portion LOG is stored. To this end, the terminal T includes downloading means MT using, for example, an infrared port communicating with a downloading station situated in a terminal sales outlet or using an address of the server A to which the terminal will connect, which address has been previously communicated to the user of the terminal. The preceding steps are therefore implemented automatically on the terminal T by the software portion LOG.

The parameters of the rules of the means MP are stored in the terminal T beforehand, for example by downloading them from the server B and the database B2. The parameters stored in the database B2 in association with the identifier ITT of the terminal T and in the terminal T are modified each time that the user changes contract pricing conditions.

The invention claimed is:

1. A telecommunications data processing system comprising a telecommunications terminal (T) that includes a data channel (E) for sending and receiving data and that is adapted to send a telecommunications service request (E1) to a first infrastructure (IT1) in the form of a telecommunications infrastructure,
the first infrastructure being associated with a second infrastructure (IT2) for storing data (DE) about the utilization of said telecommunications service,
wherein:
the second infrastructure (IT2) includes sender means (ME, M3G, B, B2) for sending an end of telecommunications service message (DC) and a triggering message (AREQ) to the telecommunications terminal (T);
the telecommunications terminal (T) includes production means (MP) for producing data (DE) about the utilization of said telecommunications service, which data relates to the telecommunications terminal (T) and is based at least on data (DT) contained in said end of telecommunications service message (DC) and data contained in said triggering message (AREQ); and
the telecommunications terminal (T) further includes detector means (MD) for detecting said end of telecommunications service message (DC) and said triggering message (AREQ) in order to cause said production means (MP) to produce said utilization data (DE) and to transmit it over the data channel (E) to said second infrastructure (IT2) for storing data (DE) about the utilization of said telecommunications service.

2. The telecommunications data processing system according to claim 1, wherein the sender means (ME, M3G, B, B2) for sending an end of telecommunications service message (DC) and a triggering message (AREQ) comprise:
first means (ME, M3G) for sending a first message which is the end of telecommunications service message (DC) containing data relating to the telecommunications service executed by the first telecommunications infrastructure (IT1) in response to the service request (DS); and
second means (B, B2) for sending a second message which is the triggering message (AREQ) containing data (DT) about the utilization of the terminal (T);
the production means (MP) being adapted to produce utilization data (DE) including at least the utilization data (DT) of the terminal (T) contained in the second message (AREQ) and updated on the basis of data contained in the end-of-service first message (DC).

3. A telecommunications data processing system according to claim 1, wherein the terminal (T) includes means (CAL) for generating and sending automatically to the second infrastructure (IT2), in response to detection of the first message (DC) by said detection means (MD), a message (REQ) requesting utilization data (DT) for the terminal (T), the second sending means (B, B2) of the second infrastructure (IT2) being adapted to send the triggering second message (AREQ) back to the terminal (T) automatically in response to said request message (REQ).

4. The telecommunications data processing system according to claim 1, wherein the second infrastructure (IT2) includes a database (B1, B2) in which said utilization data (DT, DE) is stored.

5. The telecommunications data processing system according to claim 1, wherein the second infrastructure (IT2) includes a server (B) for interrogating and updating the database (B1, B2).

6. The telecommunications data processing system according to claim 1, wherein the second infrastructure (IT2) includes a storage account (CT) for utilization data (DT, DE) that can be associated with one or more terminals (T), each terminal being associated with a single account (CT).

7. The telecommunications data processing system according to claim 1, wherein:
the means (MP) adapted to produce the utilization data (DE) are also adapted, during provision of the telecommunications service between the terminal (T) and the first infrastructure (IT1), to produce reservation data (DRES) relating to the telecommunications terminal (T) and based on data (VP) from a telecommunications service unit (US) having particular characteristics;
said sender means (ME, M3G, B, B2) for sending the second infrastructure (IT2) are also adapted to send to the terminal (T) a reservation request message (MDQ) containing said data (VP) from a telecommunications service unit (US) having particular characteristics, the terminal (T) including means (MD2) for detecting the reservation request message (MDQ); and
the production means (MP) are adapted to be triggered by the means (MP2) for detecting the reservation request message (MDQ) to produce utilization data (DE) consisting of at least said updated reservation data (DRES) on the database (DT) contained in said end of telecommunications service and triggering message (DC) and to cause it to be transmitted to the second infrastructure (IT2) for storing utilization data.

8. The telecommunications data processing system according to claim 7, wherein:
the terminal (T) includes means (CAL) responding to detection of said reservation request message (MDQ) by said detection means (MD2), to generate and send automatically to the second infrastructure (IT2) a second request message (REQ2) requesting data (DT) about the utilization of the terminal (T), the sender means (B, B2) of the second infrastructure (IT2) being adapted to send back automatically to the terminal (T) in response to said second request message (REQ2) a third message which is a triggering message (AREQ2) containing data (DT) about the utilization of the terminal (T); and
the production means (MP) are adapted to produce reservation data (DRES) consisting of at least the data (DT) about the utilization of the terminal (T) contained in the third message (AREQ2) and updated on the basis of said data (VP) contained in said reservation request message (MDQ) and coming from a telecommunications service unit (US) having particular characteristics.

9. The telecommunications data processing system according to claim 1, wherein the terminal (T) includes means (MT) for downloading from a database (B1) of the second infrastructure (IT2) parameters of the means (MP) for producing the utilization data (DE).

10. The telecommunications data processing system according to claim 1, wherein:
- the end of telecommunications service message (DC) comprises data relating to the telecommunications service executed by the first telecommunications infrastructure (IT1) in response to the service request (DS); and
- the data relating to the telecommunications service is used by the production means (MP) in producing the utilization data (DE).

11. The telecommunications terminal (T) that is adapted to send a telecommunications service request (E1) to a telecommunications first infrastructure (IT1) and that includes a data channel (E) for sending and receiving data,
wherein:
- the telecommunications terminal (T) includes detector means (MD) enabling the channel (E) to detect an end of telecommunications service message (DC) and a triggering message (AREQ) and production means (MP) for producing data (DE) about the utilization of said telecommunications service, which data relates to the telecommunications terminal (T) and is based at least on data (DT) contained in said end of telecommunications service message (DC) and said triggering message (AREQ) present in the detection means (MD); and
- said detection means (MD) are adapted, in the presence of said end of telecommunications service message (DC) and said triggering message (AREQ), to initiate production of said utilization data (DE) by said production means (MP) and its transmission over the data channel (E) to a second infrastructure (IT2) for storing data (DE) about the utilization of said telecommunications service.

12. An infrastructure (IT2) for storing data (DE) about the utilization of a telecommunications service, said service being carried out by a telecommunications infrastructure (IT1) in response to a telecommunications service request (E1) sent from a telecommunications terminal (T),
- wherein said infrastructure (IT2) includes sender means (ME, M3G, B, B2) for sending an end of telecommunications service message (DC) and a triggering message (AREQ) to the telecommunications terminal (T); and
- said infrastructure (IT2) is configured to receive utilization data (DE) transmitted by the telecommunications terminal (T) over the data channel (E), which utilization data (DE) relates to the telecommunications terminal (T) and is based at least on data (DT) contained in said end of telecommunications service message (DC) and data contained in said triggering message (AREQ).

13. The infrastructure (IT2) according to claim 12, wherein the infrastructure includes a database (B1, B2) in which said utilization data (DT, DE) is stored.

14. The infrastructure (IT2) according to claim 12, wherein the infrastructure includes a server (B) for interrogating and updating the database (B1, B2).

15. The infrastructure (IT2) according to claim 12, wherein the infrastructure includes a storage account (CT) for utilization data (DT, DE) that can be associated with one or more terminals (T), each terminal being associated with a single account (CT).

16. A method of operating the telecommunications terminal (T), wherein the method comprises the steps of:
- the telecommunications terminal (T) sending a telecommunications service request (E1) to a telecommunications first infrastructure (IT1);
- the data channel (E) of the telecommunications terminal (T) for sending and receiving data detecting an end of telecommunications service message (DC) and a triggering message (AREQ);
- in the presence of said end of telecommunications service message (DC) and said triggering message (AREQ), automatically producing data (DE) about the utilization of said telecommunications service, which data relates to the telecommunications terminal (T) and is based at least on data (DT) contained in said end of telecommunications service message (DC) and data contained in said triggering message (AREQ); and
- automatically sending said utilization data (DE) over the data channel (E) to a second infrastructure (IT2) for storing data (DE) about the utilization of said telecommunications service.

17. The method according to claim 16, wherein the method is implemented in the telecommunications terminal (T) by a computer program.

18. Computer program for being implemented on a telecommunications terminal, wherein the computer program comprises instructions for implementing the steps of the method according to claim 16.

19. Providing for downloading of a computer program according to claim 18.

20. A server containing a computer program according to claim 18, said computer program being downloaded from the server to a telecommunications terminal.

* * * * *